United States Patent
Stern

(10) Patent No.: US 10,887,661 B2
(45) Date of Patent: Jan. 5, 2021

(54) SYSTEM AND METHOD FOR CONTENT MONITORING AND FILTERING TO IMPROVE NETWORK EFFICIENCY

(71) Applicant: Stern IP Holder I, LLC, Annapolis, MD (US)

(72) Inventor: David J. Stern, Fort Meade, MD (US)

(73) Assignee: Stern IP Holder I, LLC, Annapolis, MD (US)

( * ) Notice: Subject to any disclaimer, the term of this patent is extended or adjusted under 35 U.S.C. 154(b) by 0 days.

(21) Appl. No.: 16/718,789

(22) Filed: Dec. 18, 2019

(65) Prior Publication Data

US 2020/0128301 A1 Apr. 23, 2020

Related U.S. Application Data

(62) Division of application No. 15/838,937, filed on Dec. 12, 2017, now Pat. No. 10,524,016.

(51) Int. Cl.
*H04N 7/16* (2011.01)
*H04N 21/647* (2011.01)
(Continued)

(52) U.S. Cl.
CPC ..... *H04N 21/64738* (2013.01); *G06F 16/735* (2019.01); *H04N 21/4542* (2013.01); *H04N 21/4545* (2013.01)

(58) Field of Classification Search
CPC ....... H04N 21/23418; H04N 21/44008; H04N 21/44236; H04N 21/4627; H04N 21/8358; H04N 21/84
See application file for complete search history.

(56) References Cited

U.S. PATENT DOCUMENTS 8,561,081 B1 10/2013 Richards et al.
9,306,969 B2 4/2016 Dagon et al.
(Continued)

FOREIGN PATENT DOCUMENTS

WO WO 02/098100 12/2001

OTHER PUBLICATIONS

BIG-IP Access Policy Manager Datasheet—F5 Networks, Inc.—Jul. 14, 2016.
(Continued)

*Primary Examiner* — Jason Salce
(74) *Attorney, Agent, or Firm* — Woodard Emhardt Henry Reeves & Wagner LLP

(57) ABSTRACT

A system and method of conserving network bandwidth by controlling access to resources. A filtering service determines if a resource should be blocked or allowed to pass between computers on the network based on information about the resource including the path and any query parameters in the URI along with any available metadata about the resource. The metadata may be retrieved from the remote hose, generated based on the content of the resource, or any combination thereof. One or more filtering algorithms may be engaged to compare the information about the resource to filtering rules to determine whether access to the resource is allowed. The information about the resource, and the result of the filtering algorithm may be stored to reduce the time required to make future determinations for the same resource, or for similar resources.

8 Claims, 7 Drawing Sheets

(51) Int. Cl.
H04N 21/4545 (2011.01)
H04N 21/454 (2011.01)
G06F 16/735 (2019.01)

(56) References Cited

U.S. PATENT DOCUMENTS

| | | |
|---|---|---|
| 9,674,245 B2 | 6/2017 | Karthikeyan et al. |
| 2007/0086437 A1* | 4/2007 | DiFazio .................. H04W 8/18 370/352 |
| 2007/0250863 A1 | 10/2007 | Ferguson |
| 2009/0248696 A1 | 10/2009 | Rowles et al. |
| 2009/0328093 A1 | 12/2009 | Cansler et al. |
| 2014/0344908 A1 | 11/2014 | Rizzo et al. |
| 2015/0149600 A1 | 5/2015 | Thibeault et al. |
| 2015/0169542 A1 | 6/2015 | Lin |
| 2015/0286635 A1 | 10/2015 | Donabedian |
| 2016/0134492 A1 | 5/2016 | Ellsworth et al. |
| 2018/0176641 A1 | 6/2018 | Yun et al. |

OTHER PUBLICATIONS

PAN-OS Administrator's Guide, Version 7.0—Palo Alto Networks, Inc.—Jul. 20, 2017.

\* cited by examiner

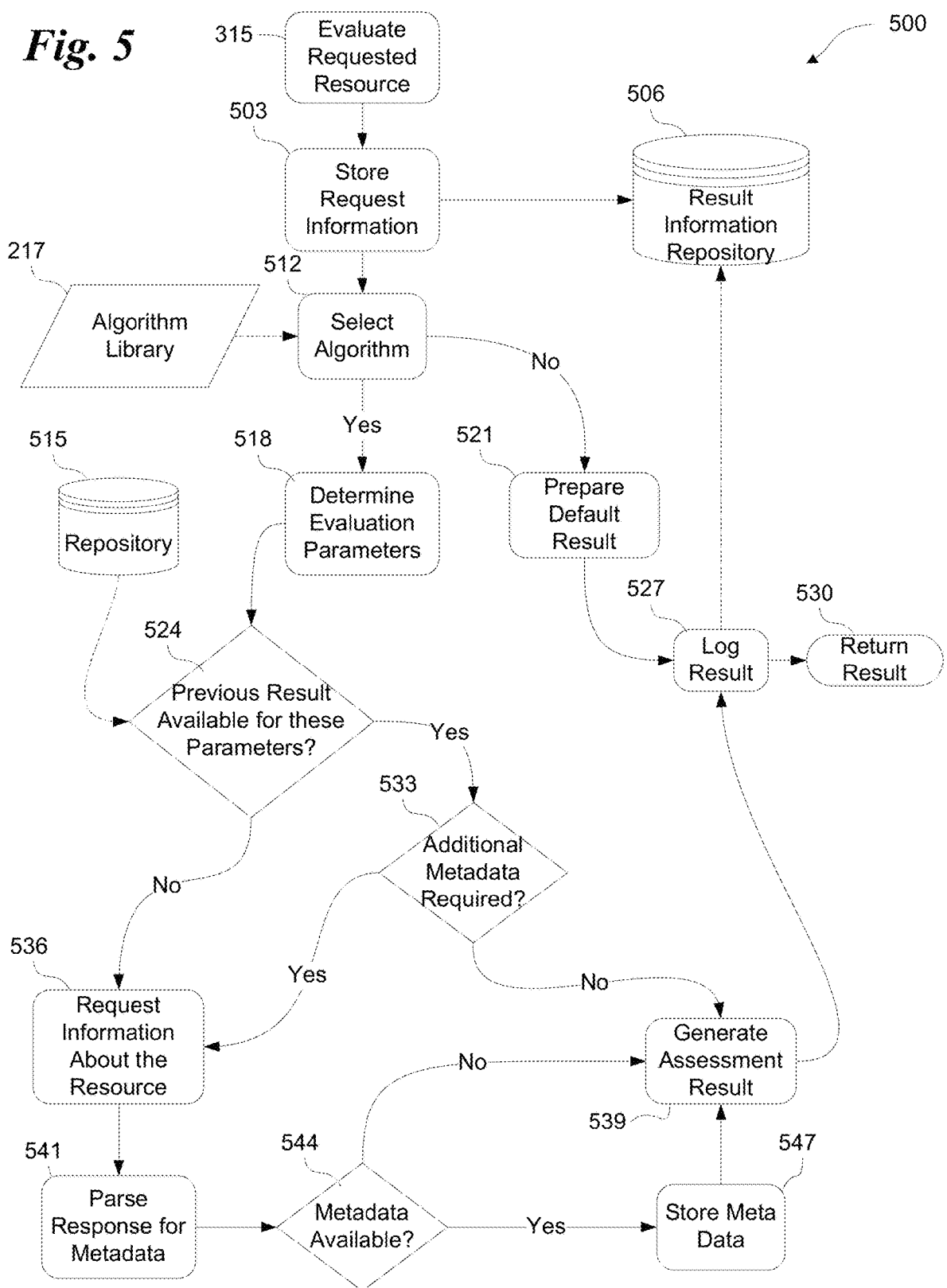

SYSTEM AND METHOD FOR CONTENT MONITORING AND FILTERING TO IMPROVE NETWORK EFFICIENCY

CROSS REFERENCE TO RELATED APPLICATION

This application is a divisional of U.S. patent application Ser. No. 15/838,937 filed Dec. 12, 2017, which is hereby incorporated by reference.

BACKGROUND

Users of public and private networks use software such as web browsers to request and obtain resources from remote computing systems such as webpages, pictures, videos, and documents. These resources are generally identified using Uniform Resource Identifiers (URIs) to identify resources. In many cases, network administrators managing a network for an organization find that much of the bandwidth on the organization's private networks is consumed delivering resources that are not relevant to the organization. Administrators sometimes find basic administrative tasks, such as backing up a large database, are hampered by lack of available bandwidth. In some cases, it can be helpful for administrators to selectively block access to certain websites such as YouTube, Vimeo, Facebook, and others which are frequented by the organization's users. One way to accomplish this is to "black hole" or "sinkhole" requests to these domains by configuring network security devices such as firewalls to simply discard any network traffic requesting resources from one of these domains.

However, this may have the unfortunate side effect of blocking access to resources the organization wants its users to have access to (e.g. training videos, videos showing competitor products, results of demonstrations, etc.). Categorizing and/or "sink holing" traffic based on largely static portions of the URI (such as the host or domain) components and ignoring potentially dynamic portions of the URI may mean that large portions of potentially important content will be excluded when it should not be.

SUMMARY

Disclosed is a system and method for content monitoring and filtering to improve network efficiency. As it relates to video content specifically, the method involves capturing input from a user specifying a request for a video resource stored on a remote computer using a network client application (e.g. an internet browser) executing on a local computer. The video resource has associated with it a resource identifier that includes a name of the remote computer, a path specifying a location of the resource on the remote computer, and a query string representing data to be sent to the remote computer. The network client application may include a monitoring module (e.g. a browser plugin) with rules programmed to determine whether the request for the video resource should be evaluated by a filtering service running on a filtering computer. The monitoring module may determine that the request for the video resource should be evaluated by the filtering service, and it may send a request for a filtering determination to the filter service that includes data specifying at least one type of determination to make with respect to the video resource (e.g. "Is this resource a video featuring cats?", "Is this a video of a professor teaching", "Does this video include depictions of violent activity?").

The filtering service may determine a filtering algorithm to use (and possibly more than one), the filtering algorithm being selected from a library of multiple algorithms programmed to determine whether the video resource matches the type of determination requested, and whether the resource will be allowed to pass through the computer network from the remote computer to the local computer. The filter service will obtain one or more filtering parameter values using the request for the filtering determination, wherein the filtering parameter values include at least the resource identifier and possibly some additional metadata about the video resource.

The filtering service may then execute the filtering algorithm(s) using the filtering parameter values. The filtering algorithm is programmed to determine a filtering result specifying whether or not the video resource should be blocked from traveling over the computer network from the remote computer to the local computer. This result is returned to the monitoring module with flags, or other indicators indicating whether or not the network client application should be allowed to request the video resource.

In another aspect, obtaining the one or more filtering parameter values may include retrieving metadata about the video resource using the filtering service. This metadata may be obtained using a separate request to the remote computer such as by using an Application Programming Interface (API), by requesting the resource and analyzing it, or by any other suitable means.

For example, the filtering service may retrieve the video resource from the remote server, and extract one or more individual frames from the video resource as one or more individual image files. The video service may compare the individual image files to one or more predefined patterns associated with the type of determination requested in the request for a filtering determination using the filtering service (e.g. match previously defined patterns of cats with the image data to determine if cats are shown in the video). This analysis may generate a confidence level for each of the one or more predefined patterns compared. This confidence level may indicate a likelihood that the individual frames from the video resource include the corresponding predefined pattern.

In another aspect, the request for the video resource may include parameters specifying that the request for the video resource, and any resulting response are to be encrypted. The monitoring module, being above the presentation layer of the Open Systems Interconnection Model (OSI model), may intercept the request from the network client application and engages the filtering service before the request is encrypted.

In another aspect, the monitoring module may block the network client application from accessing the video resource by indicating to the network client application that the video resource does not exist on the remote computer, irrespective of whether it actually does or not.

In another aspect, the filtering result may include a location of a "blocked access" resource, and the monitoring module may block the network client application from accessing the video resource by redirecting the network client application to request the "blocked access" resource instead of the video resource requested by the user.

In another aspect, the filtering service may be programmed to determine the filtering algorithm at least based on the path of the video resource, the type of determination specified in the request for the filtering determination, and/or on the query string of the video resource.

In another aspect the filtering algorithm may compare aspects of the resource identifier and the metadata with one or more rules associated with type of determination to make, and the algorithm may be programmed to evaluate at least the path, the request for the filtering determination, the metadata, and optionally any data in the query string.

The filtering service may evaluate any content available on the network. More generically, a filtering service may accept from a local computer a request for an evaluation of any remote resource stored on a remote computer. The remote resource has associated with it a resource identifier that includes a name of the remote computer, a path specifying where to find the resource on the remote computer, and a query string representing data to be sent to the remote computer. The request for the evaluation may include data specifying a type of evaluation to make with respect to the remote resource. The filtering service may determine which filtering algorithm to use based on the type of evaluation specified in the request for an evaluation, the path of the remote resource, and optionally on the query string of the remote resource. The filtering service may obtain one or more evaluation parameter values from the request for an evaluation. The evaluation parameters values may include the resource identifier for the remote resource and any available metadata about the remote resource.

The filtering algorithm is programmed to use the evaluation parameters to compare aspects of the resource identifier and the metadata with one or more rules associated with the data specifying the type of evaluation to make. The algorithm may be programmed to evaluate at least the path, the evaluation parameter values, and optionally the query string to determine if the remote resource should be allowed to transfer from the remote computer to the local computer and consume a portion of the available data bandwidth. When the determination is made to block access, the filtering service will block access to the remote resource to conserve data bandwidth.

In another aspect, obtaining filtering parameter values includes retrieving metadata about the remote resource from the remote computer using the filtering service. The filtering service may initiate a request to the remote computer for the remote resource using the resource identifier, and automatically analyze aspects of the remote resource. The filtering service may compare aspects of the remote resource to parameters in the request for an evaluation to generate metadata about the remote resource. As discussed above, when the remote resource is a video, this automatic analyzing may include extracting one or more individual frames from the video resource as one or more individual image files, and comparing the image data to one or more shapes associated with the type of determination requested in the request for the evaluation. The filtering service may generate a confidence level for each of the one or more shapes compared with us indicating the likelihood that the individual frames from the video resource include a the corresponding shape. The filtering algorithm may include a confidence level rule that blocks access to the remote resource if the confidence levels for each of the one or more shapes compared by the filtering service is above a predetermined minimum threshold. In other words, if certain shapes are found in the video with a high level of confidence, the video resource will be blocked.

In another aspect, the evaluation parameters used by the filtering algorithm may be stored in a repository to be retrieved when an evaluation of the same or a similar resource is requested in the future.

In another aspect, a network computer (e.g. firewall, router, fileserver, or other network appliance) may be placed in the network to accept a request for the remote resource sent from the local computer to a remote computer. In this example, the network computer and the local computer may communicate via a private network, and the network computer and the remote computer may communicate via a public network. The network computer may be configured to determine whether a request for an evaluation of the remote resource should be sent to the filtering service. The network computer may use filtering software with rules programmed to match aspects of the request for the remote resource to one or more configuration parameter values to determine when the request should be evaluated by the filtering service.

In another aspect, the request for the remote resource is encrypted by the local computer, and the network computer decrypts the request for the remote resource before determining whether a request for an evaluation should be sent to the filtering service. In this example, if the request was not blocked, the network computer would re-encrypt the request before sending it to the remote computer. This is an example of the filtering service used with a Break aNd Inspect (BNI). In another aspect, the filtering service is itself executed on the network computer. In another aspect, the filtering service blocks the local computer from accessing the remote resource by indicating to the local computer that the remote resource does not exist on the remote computer (e.g "black holing", or "sink holing" the network traffic associated with the request for remote content). In another aspect, the filtering service may respond to the local computer with a filtering result that includes a command redirecting the request for the remote resource to a blocked access resource available on the private network.

Further forms, objects, features, aspects, benefits, advantages, and embodiments of the present invention will become apparent from a detailed description and drawings provided herewith.

BRIEF DESCRIPTION OF THE DRAWINGS

FIG. 5 is a flow diagram illustrating actions may be taken by the filtering service of any of the preceding figures.

DETAILED DESCRIPTION

Figure 1:
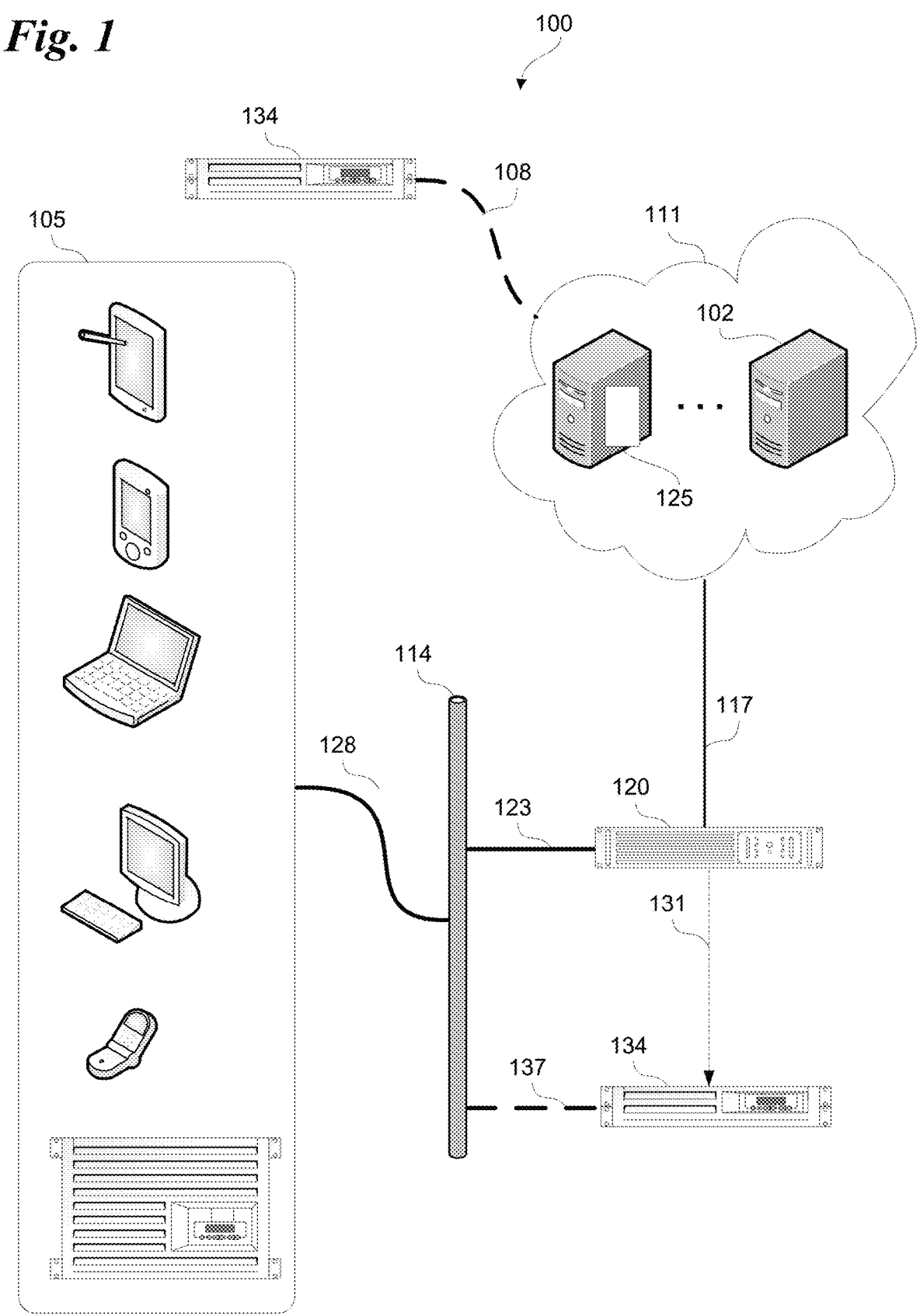
FIG. 1 is a schematic diagram illustrating components that may be included in the disclosed system for content monitoring and filtering.

For the purpose of promoting an understanding of the principles of the present disclosure, reference will now be made to the examples illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates. One example is disclosed in detail, although it will be apparent to those skilled in the relevant art that some features that are not relevant to the present disclosure may not be shown for the sake of clarity.

Disclosed are techniques for using metadata about a resource, aspects of the URI pointing to the resource, and aspects of the request for the resource such as HTTP headers to determine whether the resource should be allowed to pass through a particular network. The monitoring and filtering algorithms disclosed herein consider all of these aspects rather than simply considering only the scheme, authority, and path portions of a requested URI in conjunction with HTTP request header fields.

FIG. 1 at 100 illustrates one example of components that may be used in the disclosed system for filtering content. In general, a computer 105 accesses a resource 125 on a remote server such as servers 102. In order for the request to be fulfilled, computer 105 formulates the request, and initiates a request for the remote resource using a URI. This request passes over intervening networks and is monitored and filtered by security systems and the disclosed monitoring software. Some nonlimiting examples of computer 105 are illustrated including a tablet, smart phone, laptop computer, desktop computer, flip phone, any type of server or cloud-based system, or any other computing device. In general, any of computers 105 includes a processor, memory, a display device or other input/output devices, and software configured to make the computer operational. Such software may include network client applications such as web browsers, email clients, network games, and the like, which may exchange requests and responses, or stream data from remote computers. In the network computing environment illustrated at 100, multiple computers 105 may simultaneously access resources on multiple remote servers 102. Such resources may include, but are not limited to, webpages, images, text, data files, streaming video, streaming audio, and the like.

Access to remote resource 125 is provided to computer 105 by a local communications link 128 which may be any suitable communications link such as a wireless or wired network connection to a network 114. Network 114 may be implemented as a Local Area Network (LAN), a Wide Area Network (WAN), a Virtual Private Network (VPN), or implemented as part of another network such as the Internet 111. Network 114 may be implemented as a "private" network protected from a public network such as the Internet 111 by a network security system 120. In that case, network security system may include a firewall monitoring and controlling the flow of traffic passing between network 114 and 111 via communication links 123 and 117 based on predetermined security rules.

The content filtering system 134 may be coupled to any network that places it in communication with computers 105. For example, computers 105 may communicate with filtering system 134 via network 114 through communications link 137. This makes filtering system 134 available to computers 105, or network security system 120, or other computers connected to network 114. In another example illustrated in FIG. 1, filtering system 134 may be coupled to the Internet 111 through a communications link 108. Security system 120, and any computers 105 may thus reach the filtering system 134 by sending requests for filtering determinations over the Internet 111 (or another public network). In this scenario, filtering service 134 may operate as a "cloud-based" service on one or more computers accessible via the Internet.

Security system 120 may also include a dedicated communications link 131 between the security system computers and the content filtering system 134 that is separate from network 114. The communications link 131 may, for example, be a separate network connection included to separate security-related or content filtering traffic from network 114 to avoid conflicts with general network usage of computers 105. In another example, filtering system 134 may be included as part of security system 120. Filtering system 134, and security system 120 may be implemented using general purpose or special purpose computers which may include any suitable combination of processors for executing instructions, memory for retaining programs and data, storage devices for retaining information in nonvolatile storage, and display devices and any other suitable input or output devices.

Delivering resources between computers on a network like the one shown at 100 means that a certain amount of available network bandwidth is consumed while the resource is being transferred between remote server 102 and computer 105 (or vice versa). Bandwidth on a computer network may be a fixed commodity, or a commodity that is variable but becomes more costly as more bandwidth is used above a predetermined limit. Thus reducing bandwidth consumed at any given time reduces the overall load on network 114 leaving the network available for other processes such transferring backup files to a cloud storage server, synchronizing large databases, streaming large quantities of video or audio data to subscribers, and/or providing high-volume transactional services to customers, to name a few nonlimiting examples. Similarly, any intervening communication links between components shown at 100 such as links 128, 123, 117, and 137 may also be configured with a maximum available bandwidth. Increasing network traffic between computers 105 and remote servers 102 reduces available bandwidth on these communication links as well. In general, increased network traffic means an increase in computations performed by network devices such as firewall 120, and reducing unwanted network traffic thus has the effect of reducing computations performed by this device, and any other device tasked with managing network traffic.

Overall available network bandwidth may be managed and conserved by filtering service 134. Filtering service 134 may be configured to accept requests or queries for information about various resources being accessed by computers 105. This may be performed in any suitable manner, one of which is for the application software running on computers 105 to use a monitoring module 205 that is configured to analyze all requests for remote content and to access filtering service 134 as needed. Aspects of this type of monitoring and filtering are illustrated in FIGS. 2 and 3.

Figure 2:
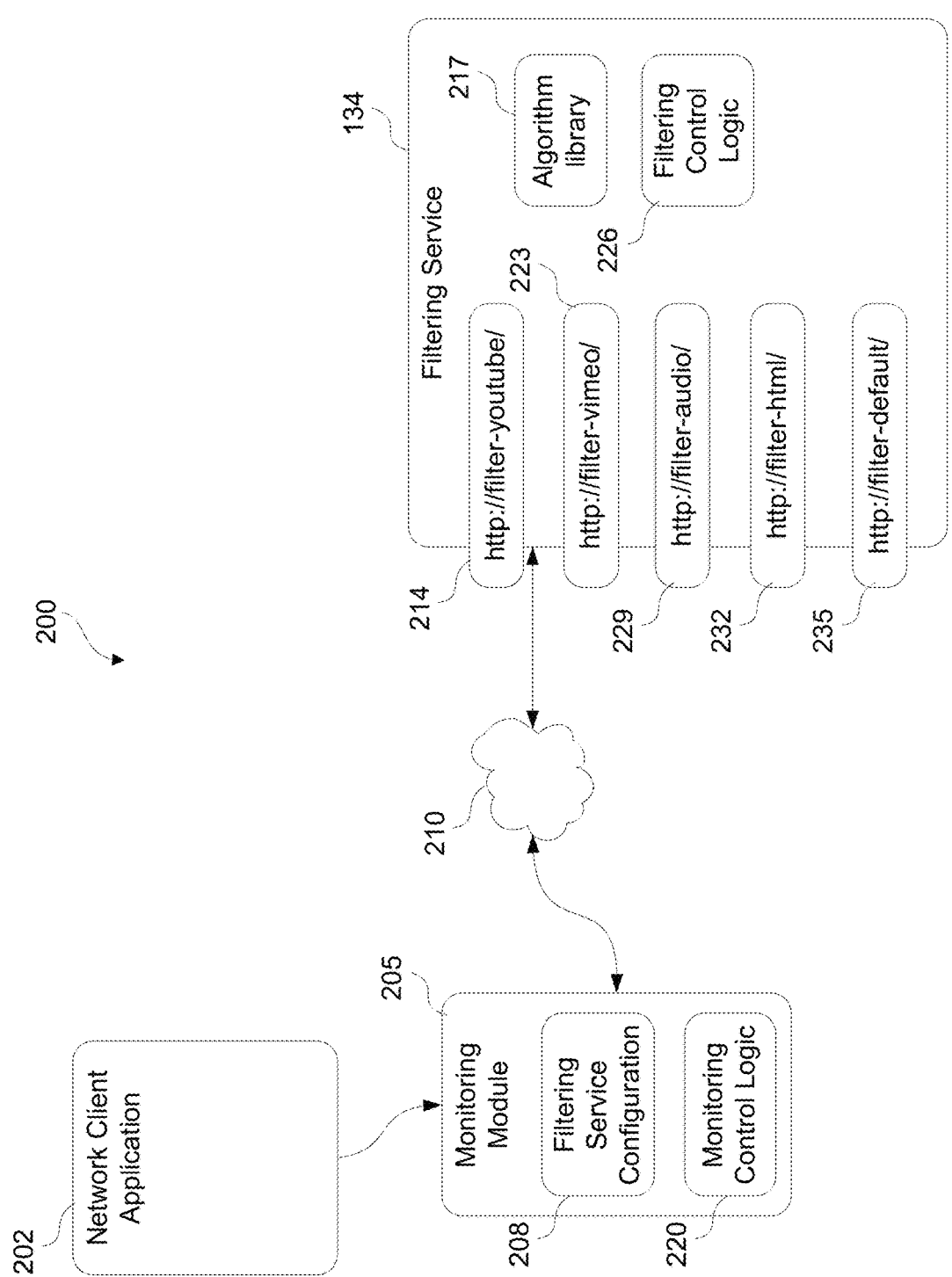
FIG. 2 is a schematic diagram illustrating one example of relationships and connections between a client application and the filtering service of FIG. 1.
Figure 3:
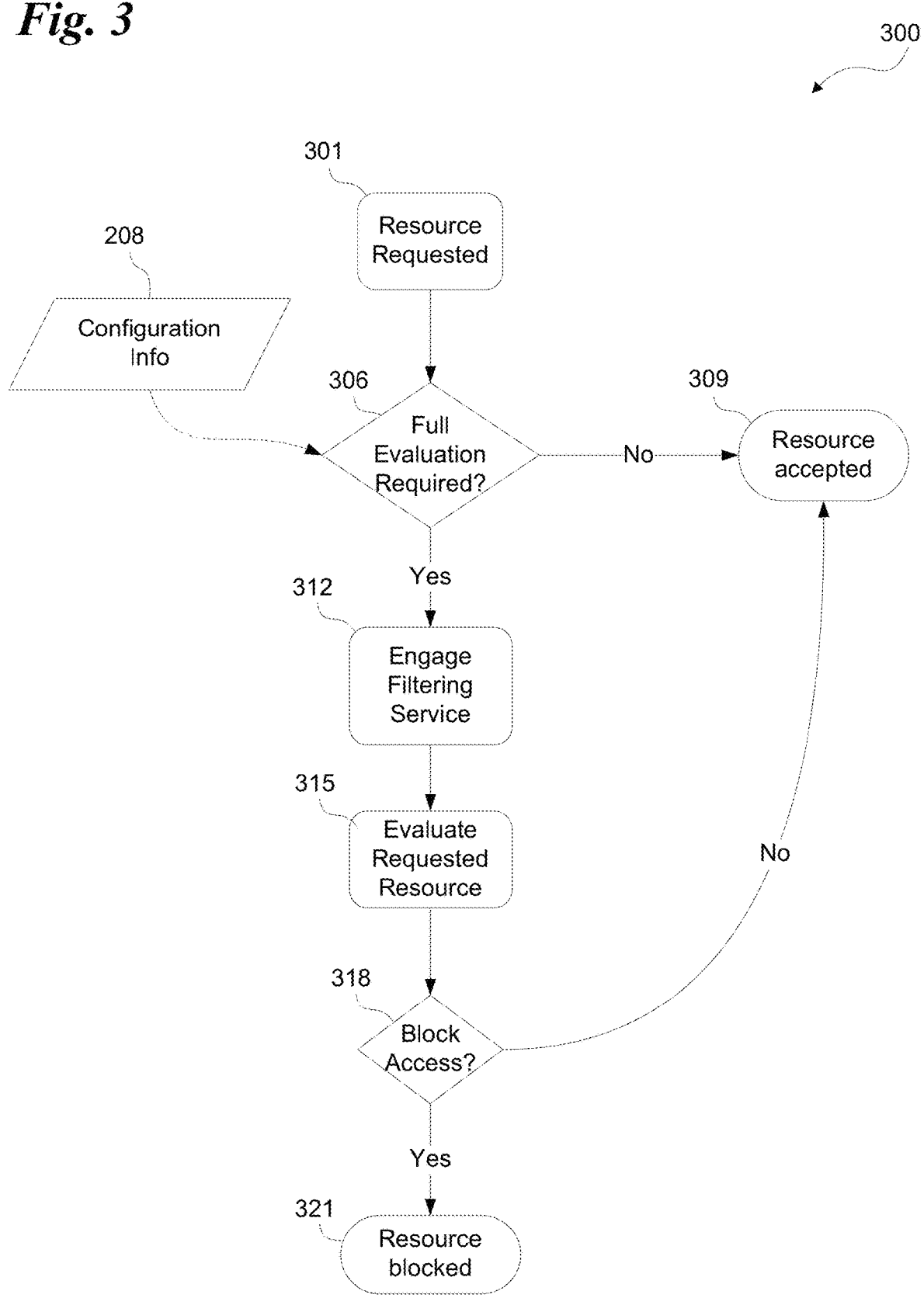
FIG. 3 is a flow-diagram illustrating actions that may be taken by the example illustrated in FIG. 2.

In FIG. 2 at 200, a network client application 202 includes or accesses monitoring module 205. Monitoring module 205 includes a filtering service configuration 208 which has configuration parameters and settings indicating how to access filtering service 134. Monitoring control logic 220 includes access rules and other control logic configured to determine whether to request a filtering determination for a resource requested by the user. Control logic 220 determines whether to ask for a determination from filtering service 134, and then uses filtering service configuration 208 to formulate the request, send it to filtering service 134 in the appropriate manner. Responses from filtering service 134 are interpreted by control logic 220 to determine what steps should be taken next.

For example, network client application 202 may be an Internet browser, and monitoring module 205 may be included in a browser "plug-in", "add-on", or other such software installed into the browser application to execute along with the browser. In this example, a browser plug-in or add-on is configured to automatically access filtering service 134 via monitoring module 205 for any request made using that particular browser. One browser plug-in may be usable by multiple installed browsers on computer 105, but more likely a separate plug-in monitoring module 205 would need to be installed for each different browser. In another example, monitoring module 205 may be installed in computer 105 such as in the case of host-based firewall software that includes or accesses monitoring module 205. In this example, any network client application 202 running on a computer 105 would automatically access monitoring module 205 when requesting a resource via network a network 210. Network 210 may be a LAN, WAN, VPN, internal private network, public network, or any suitable combination thereof.

Filtering service 134 accepts queries or filtering service requests for a particular requested resource by any suitable means, such as by specifying resource or websites specific services accessible via network 210. These specific filtering services may be made available to any device coupled to network 210 via various access points well known to computers coupled to network 210. For example, a YouTube specific service 214 may be configured that is accessible via an HTTP request to a public or private URL such as "http://filter-youtube/". A similar service 223 specific to Vimio.com may be accessible at "http://filter-vimeo/" Other examples include service 229 that is specific to audio files, or streaming audio which may be requested from and streamed by services such as Amazon Prime Music™, Apple Music®, Google Play Music™, Spotify®, Pandora®, SoundCloud®, or iHeartRadio® to name a few nonlimiting examples. In another example, a specific service 232 is configured to filter Hypertext Markup Language (HTML) requests, and another service 235 may be used to handle filtering determinations for any other request for a resource that does not match one of the content or site specific services.

One example of how the components illustrated in FIG. 2 may operate together to make a filtering determination is illustrated at 300 in FIG. 3. At 301, a resource is requested, such as by a network client application 202. One example of a network client application that might request a resource is a web browser. The user may provide input to a computer 105 requesting a resource such as by typing in the URL, clicking a link, or accessing an HTML page which has embedded in the page program code such as JavaScript, which automatically requests a resource embedded in the page. Another example of a network client application 202 that might request a resource is a game application executed by user that is requesting to access remote content necessary to play the game. Another example of a network client 202 is an operating system executing on computer 105 which may, for example, be requesting the latest update for the operating system including bug fixes, patches, and the like. Generally speaking, any software executing on a computer accessing a network 111, 114, or 210 may be thought of as a client application.

In one specific example, a user requests a resource by entering the following resource identifier (in this case a URL) into a browser application executing on a computer:

https://www.youtube.com/watch?v=iRXJXaLV0n4 thus requesting a video resource from YouTube.com. The request is passed from the browser (the network client application 202 in this example) to monitoring module 205, which in this case is a browser plug-in. Monitoring module 205 compares the identifier of the requested resource to one or more monitoring rules and control logic 220 at 306 to determine if a full evaluation is required. Configuration info 208 may also be considered in this evaluation. For example, monitoring module 205 may include a rule that compares the host domain in the requested URI against a lookup table of multiple domains configured in configuration info 208. In this example, the host domain is "youtube.com" and may correspond to an entry in a lookup table associating the requested domain "youtube.com" with a corresponding filtering service such as service 214. If no filtering service is found in configuration information 208, monitoring module 205 may engage a default service such as filtering service 235.

The "scheme" portion of the illustrated URI specifies that the request is to be made using HyperText Transport Protocol Secure (HTTPS) protocol. A request for a secure protocol like this may occur at the application layer of the OSI model, which is to say, before any encryption or security algorithms are applied. If access to the requested resource is approved, the network client application 202 will assemble an HTTP request that will be passed to the presentation layer of the OSI model. However in this example, the monitoring module 205 is configured to intercept the request and determine whether or not the filtering service 134 should be utilized. This occurs (in this example) before the HTTP request enters the Presentation Layer and thus before any encryption takes place. Once encrypted, the monitoring module would not be able to determine whether the filtering service should be engaged. In certain embodiments, the algorithm will not change the URI of the HTTP request but may add, modify, or delete other portions of the HTTP request, for example a HTTP request header may be added to indicate the algorithm has already been executed at the application layer.

When a corresponding filtering service is found by monitoring service 205, filtering service 134 may be engaged at 312. In this example, monitoring module 205 may replace one or more portions of the destination scheme, authority and path of the original HTTP request and uses either the query and/or fragment portions of the URI, the HTTP request headers, and/or the HTTP request body to prepare a request for a full determination from the filtering service using the originally requested URI, and any other relevant information about the request or the user.

The filtering algorithms in filtering service 134 may be configured to use different approaches for different URI schemes, authorities, paths, queries and/or fragments in addition to non URL based URI approaches. Filtering service 134 may be accessed by making a separate HTTP request from monitoring module 205 to a web address configured to operate as a service address by which the filtering service 134 may be engaged. For example, as shown in FIG. 2, the service address for the YouTube specific service 214 may be a URL defined as "http://filter-youtube/". The service may thus be accessed by making an HTTP request to "http://filter-youtube/" and sending information about the resource being remotely accessed. These are only exemplary, and not restrictive, as any suitable addresses may be used, as well as any suitable technology for receiving a query or request for information about the URI. Communication between the monitoring module 205 used by the client application and the filtering service may be performed by any suitable means. Services 214, 223, 229, 232, and 234, and others like them, may be accessible using any type of web service protocol or Application Programming Interface (API), using synchronous or asynchronous message queues, Message-Oriented Middleware (MOM), servers or processes implementing Representational State Transfer (REST) web services, Remote Procedure Calls (RPC), Microsoft .NET Remoting, Remote Function Call APIs, Action Message Format protocol, and/or Java Remote Method Invocation, and the like.

In one example, the identifier of the requested resource along with other data such as a query string and possibly a fragment, is encoded and attached to a service request as a parameter key or value. In this example, monitoring module 205 accesses the YouTube specific filtering service 214 by initiating an HTTP request to the filtering service as shown in Example 1 below:

http://filter-youtube/catvideo/
https%3A%2F%2Fwww.youtube.com%2Fwatch%3Fv%3DiRXJXaLV0n4 where the query to filtering service 214 is implemented as an HTTP GET request with a path portion "catvideo" that indicates that the question to answer is whether this resource is a video featuring cats, and where the only parameter key passed in the arguments is the URI requested by the user. In another example monitoring module 205 may access the service by initiating an HTTP GET request as shown in Example 2 below:

http://filter-youtube/?query=catVideo&
uri=
https%3A%2F%2Fwww.youtube.com%2Fwatch%3Fv%3DiRXJXaLV0n4 where the request to filtering service 214 is a GET request with a "query" parameter indicating the determination requested (e.g. whether the requested video features cats), and a "uri" parameter with an associated value that is the URI requested by the user (here URL encoded). In another example, monitoring module 205 may initiate the request shown in Example 3 below:

http://filter-youtube/catvideo/?=
https%3A%2F%2Fwww.youtube.com%2Fwatch%3Fv=DiRXJXaLV0n4 where the request to filtering service 214 is a GET request with parameter key "https://www.youtube.com/watch?v" and a value that is "iRXJXaLV0n4" with a path portion as shown in Example 1. In yet another example, monitoring module 205 may initiate the request shown in Example 4 below:

http://filter-youtube/catvideo/DiRXJXaLV0n4 where the request to filtering service 214 is a GET request specified as a YouTube movie by the host portion of the URI, with "catvideo" as a higher level path element, and the specific YouTube movie identifier as a lower level or more specific portion of the path in the service request.

Any suitable configuration options may be included in service configuration 208. For example, rather than accessing a specific filtering service such as YouTube filtering service 214 using parameters in a GET request, monitoring module 205 may be configured to assemble data about a user's request and send it by other means such as via an HTTP POST request to the applicable service. For example, monitoring module 205 may POST the following block of data to the filtering service URL 214 shown in Example 5 below:

```
{
  "requestedResourceContext": }
    "host": "www.youtube.com",
    "httpMethod": "GET",
    "resourcePath": "/",
    "pathParameters": {
      "v": "iRXJXaLV0n4"
    },
  },
  "query": "catvideo",
  "serviceContext": {
    "reqestId": "3bd40bae-9ae5-11e7-a9b3-45271ec356ac",
    "servicePath": "http://filter-youtube",
    "accountId": "kUine2xKxO",
    "accountPasswordKey": "9bJB2NKEUtz7u2vAyvYd",
    "Host": "filter-filtering-service.local"
    "stage": "prod"
  }
}
```

In this example a block of structured data is encoded using JavaScript Object Notation (JSON). Monitoring module 205 thus provides context about the requested resource such as the host, HTTP method used by the user's browser, the resource path, and any path parameter that were specified in the user's request for the remote resource. A "query" parameter may be included to show the type of determination being requested. Other information about the service context of the filtering service itself may be included such as a request ID for tracking purposes, the path of the service, and account ID and password that may be used to identify the specific installation of monitoring module 205 on the particular user's computer.

A JSON block like this one may be provided to filtering service 134 via YouTube specific service access 214 by initiating an HTTP POST request to the YouTube specific URL 214. Example 5 offers merely one example of fields that may be included. Any suitable arrangement of fields or data may be included. Any suitable data formatting language, markup, or data configuration may be used to express the information needed to make a full determination. For example, Extensible Markup Language (XML) may be used instead of JSON, or in any other suitable text or binary formatting scheme for representing information about the user's request may be used.

In the above mentioned examples, the YouTube specific filtering service 134 receives not only information about the host the user is requesting the remote resource from, but also specific information about the individual resource requested. This allows the filtering service 134 to more precisely control what kind of resources are made available rather than applying blanket rules blocking access to all resources from a given website. This may be advantageous as it allows administrators of network 210 to block access to certain specific resources, or types of content such as videos about cats, situational comedies, sports highlight reels, or other types of videos which although entertaining, may consume precious bandwidth that the administrators may need to reserve for other legitimate purposes.

Filtering services 134 are engaged at 312, and the resource requested by the user is examined to determine whether the requested content should be accessible or not. If blocked at 318, filtering service 134 responds by sending a negative result to monitoring module 205. Monitoring module 205 may be configured according to configuration info 208 to redirect the client application 202 (e.g. the browser) to a predetermined resource such as a "blocked" webpage at 321. This "blocked" page may include details explaining why the user's request for a particular resource is not allowed. In another example, the redirect to the blocked page may be sent directly from the filtering service and passed through by monitoring module 205 to the client application 202. In yet another example, the request may simply be "black holed" at 321 by monitoring module 205 by simply returning nothing to the client application 202 thus making it appear to the user that no resource is available at the requested URI. On the other hand, if the requested resource is allowed at 318, a positive result is sent to monitoring module 205 at 309, and the user's original request is allowed to pass through network 210.

Figure 4A:
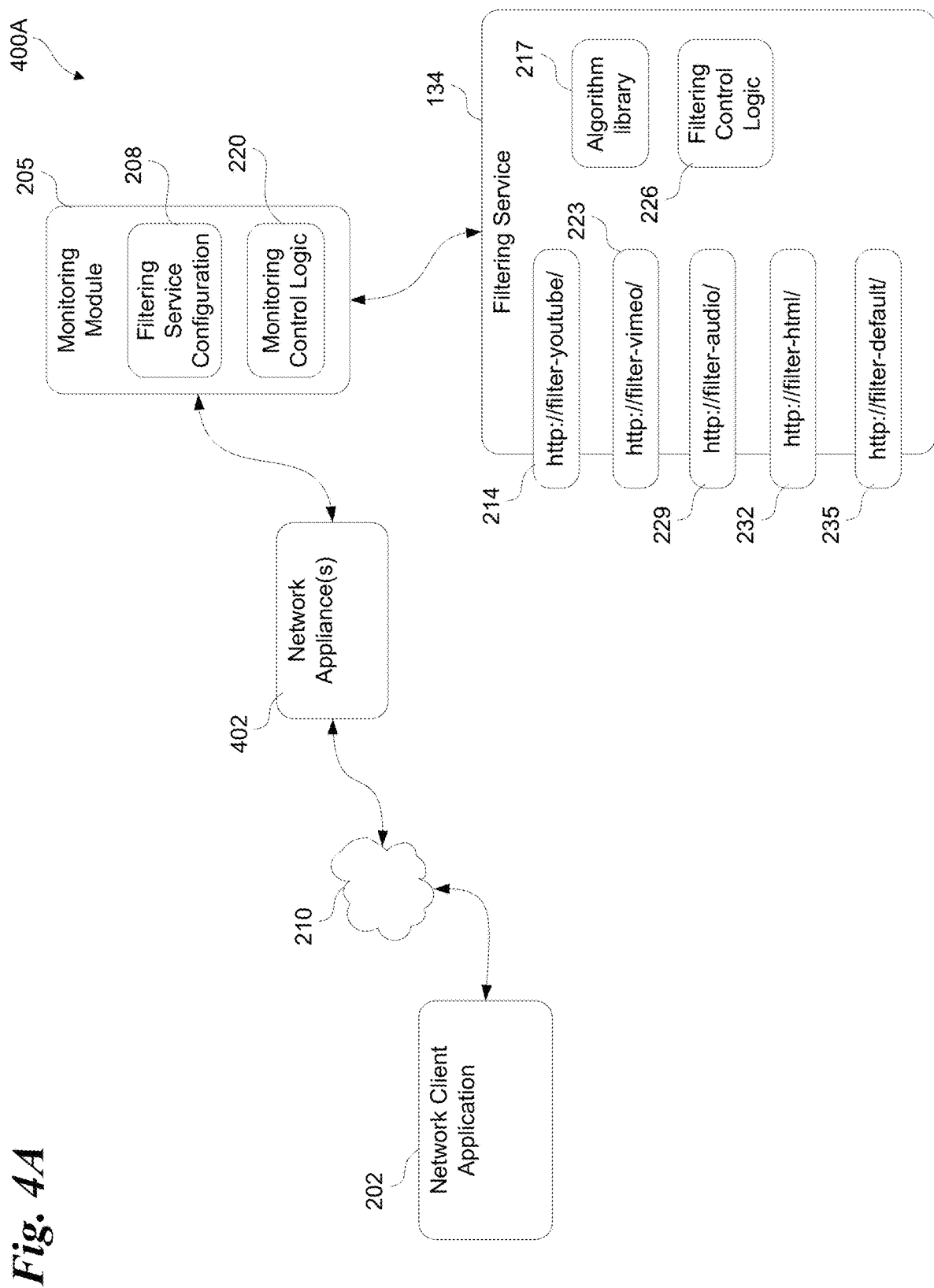
FIG. 4A is a schematic diagram illustrating an example of one configuration of a network appliance configured to use the filtering service of FIG. 1.
Figure 4B:
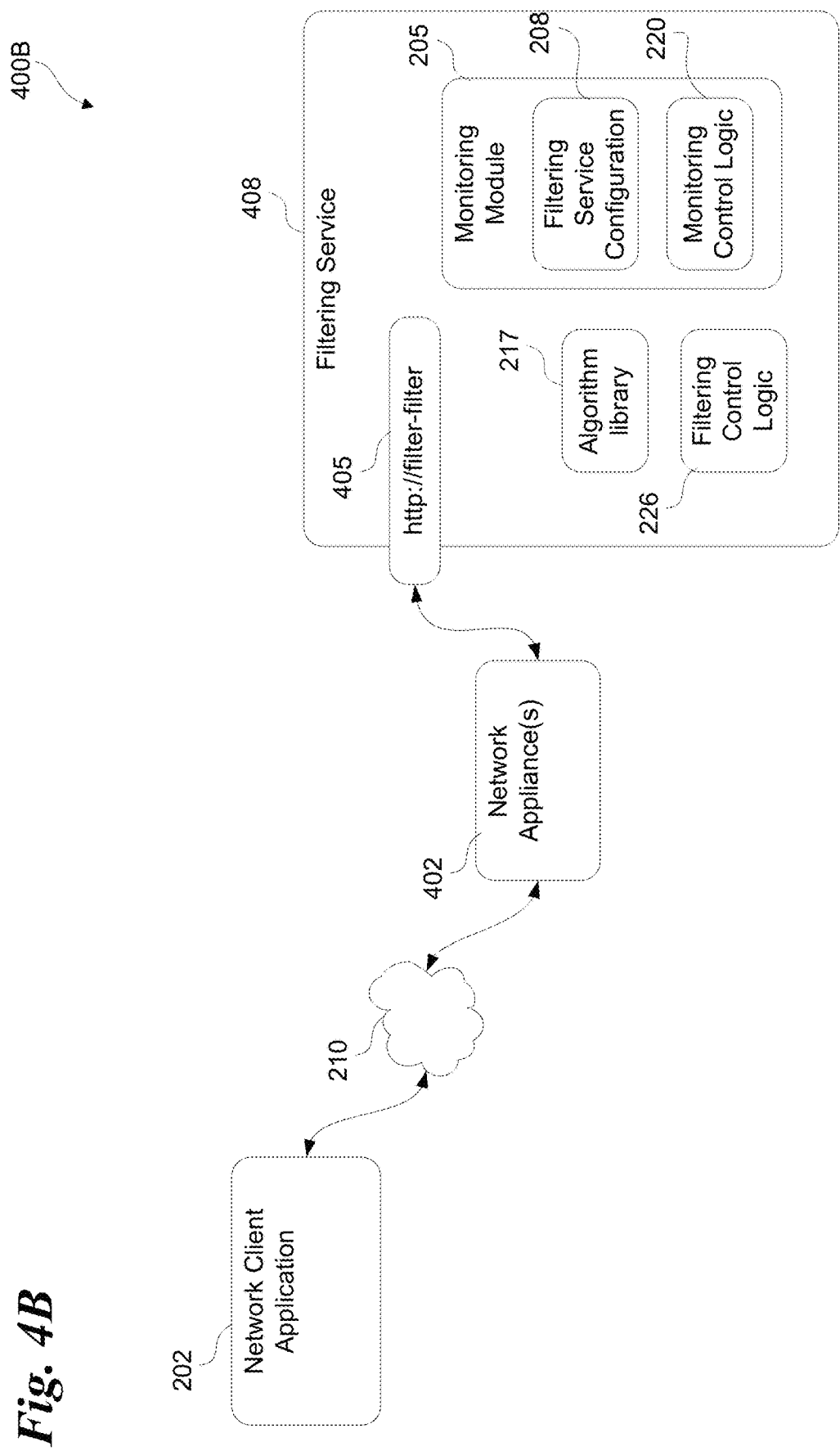
FIG. 4B is another schematic diagram illustrating an example of different configuration for the network appliance FIG. 4A.
Figure 4C:
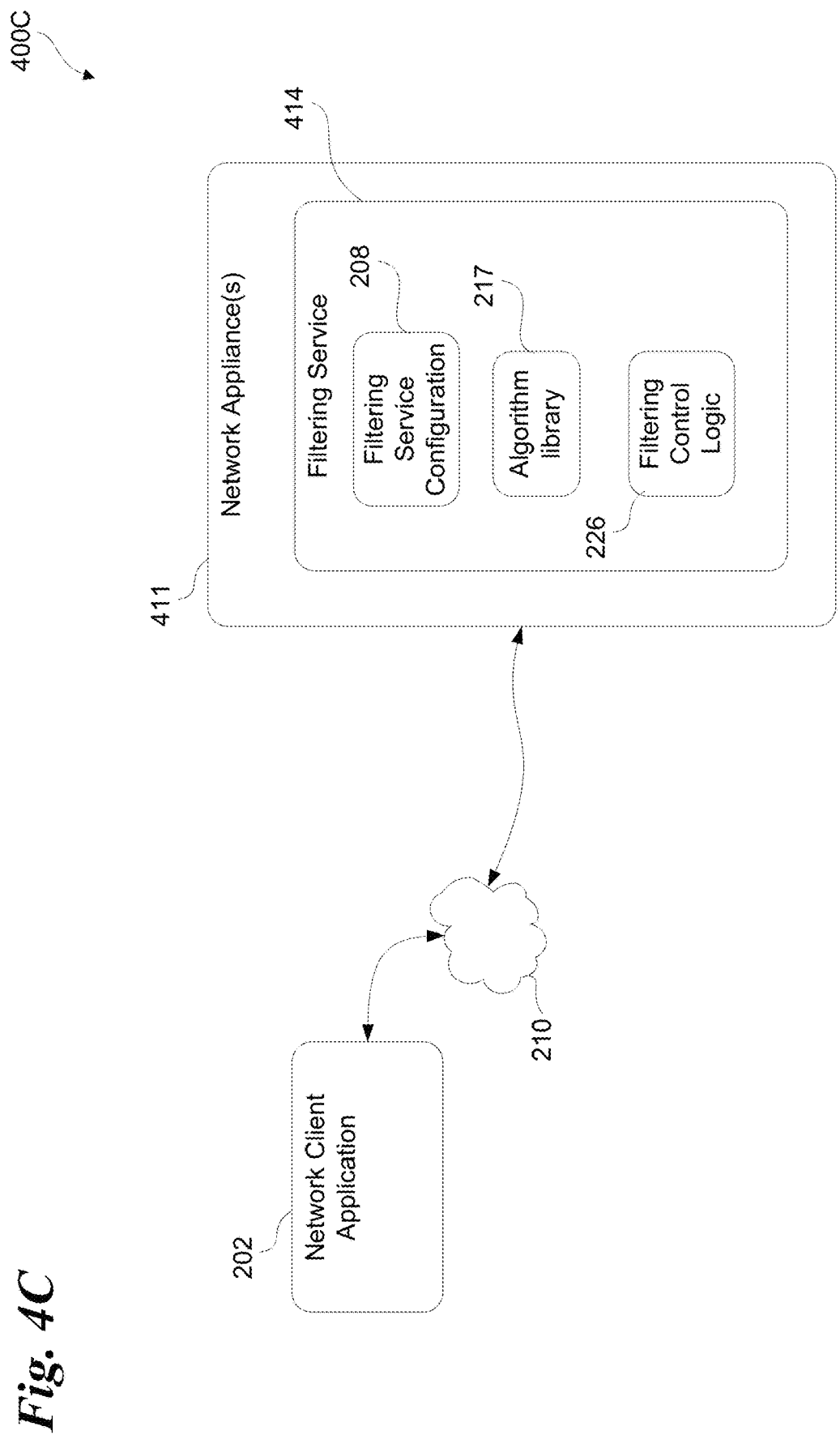
FIG. 4C is another schematic diagram illustrating yet another example of a configuration for the network appliance FIG. 4A.

FIGS. 4A-C illustrates other examples of how components in a networked environment may be configured to access the disclosed filtering service. As shown at 400A in FIG. 4A, monitoring module 205 is accessible by one or more network appliances 402. These network devices 402 may be included as part of the network security system 120 illustrated in FIG. 1, and may be implemented using general purpose or special purpose computers with processors for executing instructions, memory for retaining programs and data, storage devices for retaining information in nonvolatile storage, and a display device, and any other suitable input or output devices. This configuration has the advantage of being centrally administrated on a small number of network appliances 402 rather than requiring administration on multiple client applications 202 which may be spread across multiple physical different desktop computers, smart phone or tablet apps, and the like. Network appliance 402 may be any network appliance such as a firewall, router, network switch, server, Network Attached Storage (NAS) device, proxy server such as a Break aNd Inspect (BNI) proxy server, file server, Man-in-the-Middle (MITM) or SSL forward proxy server, application server, and the like.

FIG. 4B at 400B illustrates a filtering service 408 is accessible by network appliances 402. Filtering service 408 operates like filtering service 134, but is configured to include monitoring module 205. In this example, network devices 402 may send all requests to a common service address 405. The filtering service 408 is programmed to determine if filtering is necessary, which algorithm to use, and what result or response to send back to network appliance 402. FIG. 4C at 400C illustrates yet another example where network appliance 411 may be included that operates like network appliance 402, but includes a filtering service 414 that operates like filtering service 134 and includes relevant functional aspects of monitoring module 205. In this example, network traffic can be inspected and either allowed or denied without additional function calls, reliance on other physical servers or server processes, and the like. This may further reduce the time and computational effort required to make a filtering determination for the user.

In these examples, a hardware and/or software network appliance like appliances 402, 408, or 411, is positioned in the network path between computers 105 and remote computer such as computers 102. In order to examine the requested URIs for encrypted requests using HTTPS or similar protocols, the network device 402, 408, or 411 may be configured to operate as a proxy, first decrypting the digital information, and using the URI, request header fields, or other request metadata to determine if the requested URI should be blocked. The network appliance may effectively let the request pass through, redirect the request to a "access denied/blocked" page with some explanation, or simply "sink hole" the request thus making it appear to the user that the requested resource does not exist.

Referring now to the filtering process itself in more detail, FIG. 5 at 500 illustrates a flow-diagram of one example of actions that may be taken to filter requests for resources implemented by filtering services like service 134, 408, and 414. The filtering operations may be executed on a computer according to filtering control logic 226. A request to evaluate a resource at a given URI is received by the filtering service at 315. The requested URI is initially stored in a repository 506 at 503. This allows the system to later associate the result of the evaluation with the requested URI. This allows future evaluations to be handled more quickly, where possible.

The requested URI may be stored in any suitable manner, such as by associating the URI and the result with a key. The key may be the requested URI, the date and time of the request, any of the key/value pairs which may be included in the URI as part of a HTTP GET request, any data that may be present as part of an HTTP POST request, cookie data or other information that may be extracted from any HTTP headers sent with the request, or any combination thereof by which a unique key may be generated.

At 512, the filtering algorithm to use may be selected from a library of algorithms 217. As discussed herein elsewhere, the algorithm to use may be based on the particular service request and any data passed with it. If no algorithm is found, a default result may be prepared at 521 and logged at 527. For example, systems requesting evaluation of a URI that maps to a YouTube filtering service would select one or more algorithms specific to YouTube URIs at 512. As discussed with respect to FIG. 4B, the filtering service may be configured with a single service access point 405, or as shown in FIG. 4C, may be engaged automatically as part of the normal course of operation for network appliance 411 for every URI requested. In both of these examples, configuration information 208 may be used to determine which algorithm to use at 512.

The selected algorithm uses evaluation parameters to determine how to proceed. These evaluation parameters are determined at 518, and may be retrieved, generated, or otherwise determined based on whatever information about the URI has been provided to the filtering service, including the URI itself. When the call to the filtering service is another separate HTTP GET or POST request to a filtering service address like 214, 229, and the like, the algorithm may obtain evaluation parameters from components or aspects of the service URI, request headers in the service request, any arguments, parameters, or data sent via GET or POST or by any other means.

For example, as discussed above with respect to Example 2, the algorithm to use may be determined based on the service URL used (i.e. "filter-youtube"), and the algorithm selected may then look for a "query" or other suitable parameter indicating what kind of determination is being requested about this particular YouTube video, and the URI for that video may also be included as the value of the "uri" parameter. Similarly, where the information about the request is sent via a POST as shown in Example 5, data such as the "pathParameters" may be taken from the "requestedResourceContext" section and used as evaluation parameters. Any aspect of the information presented to the filtering service may be considered such as the scheme, authority, path, query, and fragment of the service URI. For example as shown above in Example 2, the algorithm is determined by the service call to "filter-youtube", and the specific determination requested is determined by the "path" portion of the service URI, in this case "catvideo". The URI the user requested is offered as a key/value pair with "uri" as the key and the full path to the YouTube resource as the value.

Using the evaluation parameters, the algorithm may determine at 524 whether previous results have been analyzed for the particular set of evaluation parameter names and values associated with the URI requested by the user. This determination may include accessing information about previous parameter names and values from a local or remote repository 515. For example, the process might include querying the repository 515 for all entries matching the YouTube video specified by the identifier shown in the examples above, namely "iRXJXaLV0n4", and filter out all results except those that match the "query" aspect. Thus the repository may respond with all "catvideo" determinations made for the resource requested by the user. If there is an existing determination for the current evaluation parameters and their associated values, the algorithm may be able to avoid additional processing. If determination has not been made previously, or all previous determinations for the requested resource are invalid for any reason, or if additional metadata is otherwise required a 533, the algorithm may begin assembling the data it will use to develop a determination.

For example, at 536, the system may request information about the resource using an API provided by the source of the requested content. In the previous examples, a YouTube movie is requested, although this is not the only kind of resource the disclosed system can handle. Thus, the system may use the "YouTube APIv3" API to obtain information about the requested URI. This may, for example, be performed by initiating a separate HTTPS request to a URI like the one shown in Example 6 below:

```
https://www.googleapis.com/youtube/
v3/videos?part=id%2Csnippet&id=iRXJXaLV0n4
```

Alternatively, the filtering service may simply send an HTTP request to the URI the user requested to analyze the data sent back in response. In either case, the response may be parsed for clues about what kind of resource the user has requested. In general, the algorithm parses whatever response is available at 541, and determines if any metadata can be obtained from it at 544. If so, it stores the resulting metadata in repository 515 at 547, and generates an assessment at 539. The assessment is logged at 527 in the repository 506 and is thus associated with the requested URI. The final result is returned at 530.

An example of the metadata information that might be returned in an API call is shown below in Example 7 where the data returned in the response from the API call is formatted as an HTTP response with JSON:

```
HTTP/1.1 200 OK
Date: Sun, 17 Sep 2017 19:51:47 GMT
cache-control:  private, max-age=300, must-revalidate, no-transform
content-encoding:  gzip
content-length:  1248
content-type:  application/json; charset=UTF-8
etag:  "VPWTmrH7dFmi4s1RgrK4tLejnRI/
TZrhcC2oCRk1HIzrkHWVyzoaWjA"
expires:  Sun, 17 42979 19:51:47 GMT
server:  GSE
vary:  Origin, X-Origin
{
  "kind": "youtube#videoListResponse",
  "etag": "\"VPWTmrH7dFmi4s1RgrK4tLejnRI/
TZrhcC2oCRk1HIzrkHWVyzoaWjA\"",
  "pageInfo": {
    "totalResults": 1,
    "resultsPerPage": 1
  },
  "items": [
    {
      "kind": "youtube#video",
      "etag": "\"VPWTmrH7dFmi4s1RgrK4tLejnRI/
LjFcdd9J6isiehZN9-o__v6r3rLI\"",
      "id": "iRXJXaLV0n4",
      "snippet": {
        "publishedAt": "2017-01-07T17:30:43.000Z",
        "channelId": "UCR2KG2dK1tAkwZZjm7rAiSg",
        "title": "Try to stay SERIOUS -The most popular CAT videos",
        "description": "Cats are simply the funniest and most hilarious pets, [redacted]",
        "thumbnails": {
          "default": {
            "url": "https://i.ytimg.com/vi/iRXJXaLV0n4/default.jpg",
            "width": 120,
            "height": 90
          }
        },
        "channelTitle": "Tiger Funnies",
        "tags": [
          "cat",
          "cats",
          "kitten",
          "kittens",
          [redacted]],
        "categoryId": "15"
      }
    }
  ]
}
```

Where the API call is made, the algorithm may compare the results with one or more rules that are triggered when various keywords are found that relate to the "query" aspect of the filtering service request. In this case, that means looking for words related to "catvideos" such as feline, cat, kitten, and the like, in the response. The algorithm may be programmed specifically to search for YouTube specific fields and related values such as the categoryId, channelId, channelTitle or other portions of the metadata to make a determination, e.g. "Is this is a cat video?".

For many resources, metadata about the requested resource is limited in type, quality, and quantity, or includes errors, or is otherwise either unavailable or unreliable. Thus it may be advantageous to obtain metadata by other means, along with, or instead of making an API call, even if such an API is available. The filtering service may employ more sophisticated algorithms such as algorithms using artificial intelligence or machine learning approaches to processing content such as videos, pictures, text, HTML5 animations, or other content users may request.

For example, the algorithm may request the actual resource identified by the URI the user requested at 536. Where the requested resource is a video, the algorithm may retrieve the resource then programmatically extract separate frames from the video and storing them for analysis. In one example, each frame may be stored as a separate image file. The algorithm may extract all frames from the requested video, every $10^{th}$ frame, every $60^{th}$ frame, or a random sample of frames, the number of which may be determined based on the length of the video.

The extracted frames may then be stored in a repository like repository 515 where they may be processed by an image recognition API, examples of which include Amazon Web Services Rekognition, and Google Cloud Platform Cloud Vision. These algorithms may process the frame image files and generate relevant metadata about each image, each collection of images, and/or about an entire video. This processing may occur synchronously, that is to say, while the user is waiting for the filtering service to make its final determination, or asynchronously at some other time. To avoid making a user wait too long, an initial determination may be returned which may, for example, give access to the resource. However, the filtering service may then begin processing the resource to extract metadata in the background. The filtering service may eventually determine that the resource actually should be blocked, causing an update of the final determination in the metadata records in repository 515 then subsequent requests for the same resource may then be blocked.

An example of a portion of the results of this kind of frame-by-frame determination for a given video is shown below in Example 8:

| Video Key Words | |
|---|---|
| Confidence | Keywords |
| 99.0%+ | [ ] |
| 95.0%+ | [ ] |
| 90.0%+ | ["Pet", "Siamese", "Animal", "Cat"] |
| 80.0%+ | ["Tablet Computer", "Computer", "Yard", "Backyard", "Electronics", "Adorable"] |
| 50.0%+ | ["Sunglasses", "Animal", "Flooring", "Space", "Pet", "Housing", "Nebula", "Pigeon", "Ankle", "Wood", "Plywood", "Corridor", "Outer Space", "Adorable", "Bird", "Road", "Porch", "Poster", "Floor", "Alley", "Hand", "Flyer", "Sink", "Goggles", "Brochure", "File Folder", "Town", "File Binder", "Siamese", "Universe", "Dog", "Cat", "Alleyway", "Mammal", "Swallow", "Patio", "Glasses", "Deck", "Hardwood", "Text", "Flagstone", "Canine", "Street", "Paper", "Heel", "Pointer", "Finger"] |

In this example, the determination was made with 90% confidence that the images included pets, cats, animals, and in particular, Siamese cats. Other concepts where discovered with 80% confidence, while still others with 50% confidence. These keywords may be added to the overall knowledge base of requested URIs in repository 515, and/or to the result information repository 506. Upon completion, The video metadata analysis procedure may delete the associated frame image files.

The algorithm may consider the text, images, or other content and obtain keywords to make a determination and generate an assessment result at 539. In terms of the illustrated example of determining whether a video is a "cat video" the algorithm may only consider data with a confidence that is above a predetermined minimum threshold. In one example, a "true" result is made for a "catvideo" determination if the algorithm finds "animals, cats, cat, felines" and/or other relevant keywords with a confidence greater than 90%. In another example, the confidence level is greater than 95%. In another example, a confidence level greater than 50% may be considered sufficient to return a "true" result. In these examples, confidence levels below the predetermined threshold return a "false" result.

The disclosed filtering system has been illustrated herein with respect to YouTube videos featuring cats. However, any determination may be considered with respect to any resource and any question about the content that may be included in the resource. Examples include determining if the resource includes sexually explicit material, determining if a particular person is depicted, discussed, or featured, determining whether certain objects are shown or mentioned by the requested resource such as knives, guns, or other weapons, determining if violent acts are being depicted, or determining if illegal activity is portrayed or discussed such as drug use, or child pornography.

Such determinations may be combined at 539 when an overall assessment is made. For example, determining if the resource includes depictions of violence with a weapon, or whether a particular person is included and performing a particular activity, such as in the case of a particular professor or trainer performing a specific task or explaining a particular concept with certain desirable illustrations.

When a final determination is made at 539, the result may be logged at 527 associating the overall result and any relevant information about it, such as some or all of the metadata used to determine the result. The result is then returned at 530 to the application or device that requested the determination. In the case of a negative result, the request may be "sink-holed" altogether thus avoiding any opportunity for the requested content to be delivered from the remote computers across the intervening network. In this way, network bandwidth may be conserved.

Glossary of Definitions and Alternatives

While the invention is illustrated in the drawings and described herein, this disclosure is to be considered as illustrative and not restrictive in character. The present disclosure is exemplary in nature and all changes, equivalents, and modifications that come within the spirit of the invention are included. The detailed description is included herein to discuss aspects of the examples illustrated in the drawings for the purpose of promoting an understanding of the principles of the invention. No limitation of the scope of the invention is thereby intended. Any alterations and further modifications in the described examples, and any further applications of the principles described herein are contemplated as would normally occur to one skilled in the art to which the invention relates. Some examples are disclosed in detail, however some features that may not be relevant may have been left out for the sake of clarity.

Where there are references to publications, patents, and patent applications cited herein, they are understood to be incorporated by reference as if each individual publication, patent, or patent application were specifically and individually indicated to be incorporated by reference and set forth in its entirety herein.

Singular forms "a", "an", "the", and the like include plural referents unless expressly discussed otherwise. As an illustration, references to "a device" or "the device" include one or more of such devices and equivalents thereof.

Directional terms, such as "up", "down", "top" "bottom", "fore", "aft", "lateral", "longitudinal", "radial", "circumferential", etc., are used herein solely for the convenience of the reader in order to aid in the reader's understanding of the illustrated examples. The use of these directional terms does not in any manner limit the described, illustrated, and/or claimed features to a specific direction and/or orientation.

Multiple related items illustrated in the drawings with the same part number which are differentiated by a letter for separate individual instances, may be referred to generally by a distinguishable portion of the full name, and/or by the number alone. For example, if multiple "laterally extending elements" 90A, 90B, 90C, and 90D are illustrated in the drawings, the disclosure may refer to these as "laterally extending elements 90A-90D," or as "laterally extending elements 90," or by a distinguishable portion of the full name such as "elements 90".

The language used in the disclosure are presumed to have only their plain and ordinary meaning, except as explicitly defined below. The words used in the definitions included herein are to only have their plain and ordinary meaning. Such plain and ordinary meaning is inclusive of all consistent dictionary definitions from the most recently published Webster's and Random House dictionaries. As used herein, the following definitions apply to the following terms or to common variations thereof (e.g., singular/plural forms, past/present tenses, etc.):

"Algorithm" generally refers to a set of steps or rules that precisely defines a sequence of operations. Algorithms can be expressed in any suitable notation, including natural languages, pseudocode, flowcharts, drakon-charts, programming languages, state diagrams, and/or control tables to name a few non-limiting examples. Programming languages are generally intended for expressing algorithms in a form that can be executed by a computer, but may also be used to define or document an algorithm. In context of computer systems and programming languages, examples of an "algorithm" include, but are not limited to, a portion of code (e.g. a few lines), an object method, a function, a subroutine, or an entire program or system executed by a processor. Algorithms can be grouped together and precompiled or otherwise preassembled into libraries such as in the case of an Application Programming Interface (API). Programming concepts for implementing control flow may be thought of as algorithms. Examples of these include unconditional branch or jump statements and logic associated therewith, count-controlled loops, condition-controlled loops, collection-controlled loops, iterators, infinite loops, exception control logic, asynchronous or multi-threaded programming constructs, coroutines, or generators.

"Bandwidth" generally refers to the maximum throughput of a logical or physical communication path in a communication system. Bandwidth is a transfer rate that can be expressed in units of data transferred per second. In a digital communications network, the units of data transferred are bits and the maximum throughput of a digital communications network is therefore generally expressed in "bits per second" or "bit/s." By extension, the terms "kilobit/s" or "Kbit/s", "Megabit/s" or "Mbit/s", and "Gigabit/s" or "Gbit/s" can also be used to express the bandwidth of a given digital communications network. Data networks may be rated according to their bandwidth performance characteristics according to specific metrics such as "peak bit rate", "mean bit rate", "maximum sustained bit rate", "information rate", or "physical layer useful bit rate." For example, bandwidth tests measure the maximum throughput of a computer network. The reason for this usage is that according to Hartley's Law, the maximum data rate of a physical communication link is proportional to its frequency bandwidth in hertz.

Bandwidth may also be characterized according to the maximum transfer rate for a particular communications network. For example:

"Low Bandwidth" generally refers to a communications network with a maximum data transfer rate that is less than or about equal to 1,000,000 units of data per second. For example, in a digital communications network, the unit of data is a bit. Therefore low bandwidth digital communications networks are networks with a maximum transfer rate that is less than or about equal to 1,000,000 bits per second (1 Mbits/s).

"High Bandwidth" generally refers to a communications network with a maximum data transfer rate that is greater than about 1,000,000 units of data per second. For example, a digital communications network with a high bandwidth is a digital communications network with a maximum transfer rate that is greater than about 1,000,000 bits per second (1 Mbits/s).

"Black hole" or "Sink hole" generally refers to places in a computer network where incoming or outgoing traffic is silently discarded (or "dropped"), without indicating to the source of the traffic that the traffic was discarded and did not reach its intended recipient. When examining the topology of a computer network, devices operating as "black hole" devices are invisible, and can only be detected by carefully monitoring the lost traffic.

Most firewalls, and many routers, can be configured to silently discard packets addressed to forbidden hosts or ports, resulting in "black holes" in the network. When performing Network Address Translation (NAT) functions, a network appliance can create "black holes" obscuring the layout of an internal network by, for example, failing to translate addresses for requests sent to certain hosts on the internal network. This may be referred to as "Black hole filtering" or simply "black holing" where certain packets are dropped at the routing level. This may involve configuring a routing protocol to implement the filtering on several routers at once, often dynamically to respond quickly to threats such as distributed denial-of-service attacks.

The concept of "Black Holes" may also be implemented at the domain name translation level to create a DNS-based Blackhole List (DNSBL) or Real-time Blackhole List (RBL). These are lists of IP addresses published through the Internet Domain Name System (DNS) either as a zone file that can be used by DNS server software, or as a live DNS zone that can be queried in real-time. DNSBLs are most often used to publish the addresses of computers or networks linked to spamming. Mail server software can generally be configured to reject or flag messages which have been sent from a site listed on one or more such lists. In this context, the term "Blackhole List" is sometimes interchanged with the term "blacklist" and "blocklist".

A DNSBL is a software mechanism, rather than a specific list or policy. There are many DNSBLs in existence, which use a wide array of criteria for listing and delisting of addresses. These may include listing the addresses of zombie computers or other machines being used to send spam, listing the addresses of ISPs who willingly host spammers, or listing addresses which have sent spam to a honeypot system.

The term "black holing" may also be used here to refer to the act of blocking access to a resource on a computer network by discarding the traffic without responding using "Black Hole" behavior as described above.

"Computer" generally refers to any computing device configured to compute a result from any number of input values or variables. A computer may include a processor for performing calculations to process input or output. A computer may include a memory for storing values to be processed by the processor, or for storing the results of previous processing.

A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. The network interface may be part of the computer, or characterized as separate and remote from the computer.

A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the internet. Thus computer may include one or more physical processors or other computing devices or circuitry, and may also include any suitable type of memory.

A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer.

The concept of "computer" and "processor" within a computer or computing device also encompasses any such processor or computing device serving to make calculations or comparisons as part of disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible.

Multiple computers or computing devices may be configured to communicate with one another or with other devices over wired or wireless communication links to form a communication network. Network communications may pass through various computers operating as network appliances such as switches, routers, firewalls or other network devices or interfaces before passing over other larger computer networks such as the internet. Communications can also be passed over the communication network as wireless data transmissions carried over electromagnetic waves through transmission lines or free space. Such communications include using WiFi or other Wireless Local Area Network (WLAN) or a cellular transmitter/receiver to transfer data. Such signals conform to any of a number of wireless or mobile telecommunications technology standards such as 602.11a/b/g/n, 3G, 4G, and the like.

"Communication Link" generally refers to a connection between two or more communicating entities and may or may not include a communications channel between the communicating entities. The communication between the communicating entities may occur by any suitable means. For example the connection may be implemented as a physical link, an electrical link, an electromagnetic link, a logical link, or any other suitable linkage facilitating communication.

In the case of physical link, communicating entities may be physically connected one to another. For example, the physical link directly connected to one entity may be directly connected to another. In the case of an electrical link, the communication link may be composed of one or more electrical conductors electrically connected to the communicating entities to form the communication link. In the case of an electromagnetic link, the communicating entities may be coupled to a communications link by sending or receiving electromagnetic energy at any suitable frequency, thus allowing communications to pass as electromagnetic waves. These electromagnetic waves may or may not pass through a physical medium such as a wire or an optical fiber, or through free space, or any combination thereof. Electromagnetic waves may be passed at any suitable frequency including any frequency in the electromagnetic spectrum.

In the case of a logical link, the communication link may be a conceptual linkage between the sender and recipient such as a transmission station and receiving station. Logical link may include any combination of physical, electrical, electromagnetic, or other types of communication links.

"Database" also referred to as a "data store", "data repository", or "knowledge base" generally refers to an organized collection of data. The data is typically organized to model aspects of the real world in a way that supports processes obtaining information about the world from the data. Access to the data is generally provided by a "Database Management System" (DBMS) consisting of an individual computer software program or organized set of software programs that allow user to interact with one or more databases providing access to data stored in the database (although user access restrictions may be put in place to limit access to some portion of the data). The DBMS provides various functions that allow entry, storage and retrieval of large quantities of information as well as ways to manage how that information is organized. A database is not generally portable across different DBMSs, but different DBMSs can interoperate by using standardized protocols and languages such as Structured Query Language (SQL), Open Database Connectivity (ODBC), Java Database Connectivity (JDBC), or Extensible Markup Language (XML) to allow a single application to work with more than one DBMS.

Databases and their corresponding database management systems are often classified according to a particular database model they support. Examples include a DBMS that relies on the "relational model" for storing data, usually referred to as Relational Database Management Systems (RDBMS). Such systems commonly use some variation of SQL to perform functions which include querying, formatting, administering, and updating an RDBMS. Other examples of database models include the "object" model, the "object-relational" model, the "file", "indexed file" or "flat-file" models, the "hierarchical" model, the "network" model, the "document" model, the "XML" model using some variation of XML, the "entity-attribute-value" model, and others.

Examples of commercially available database management systems include PostgreSQL provided by the PostgreSQL Global Development Group; Microsoft SQL Server provided by the Microsoft Corporation of Redmond, Wash., USA; MySQL and various versions of the Oracle DBMS, often referred to as simply "Oracle" both separately offered by the Oracle Corporation of Redwood City, Calif., USA; the DBMS generally referred to as "SAP" provided by SAP SE of Walldorf, Germany; and the DB2 DBMS provided by the International Business Machines Corporation (IBM) of Armonk, N.Y., USA.

The database and the DBMS software may also be referred to collectively as a "database". Similarly, the term "database" may also collectively refer to the database, the corresponding DBMS software, and a physical computer or collection of computers. Thus the term "database" may refer to the data, software for managing the data, and/or a physical computer that includes some or all of the data and/or the software for managing the data.

"Display device" generally refers to any device capable of being controlled by an electronic circuit or processor to display information in a visual or tactile. A display device may be configured as an input device taking input from a user or other system (e.g. a touch sensitive computer screen), or as an output device generating visual or tactile information, or the display device may configured to operate as both an input or output device at the same time, or at different times.

The output may be two-dimensional, three-dimensional, and/or mechanical displays and includes, but is not limited to, the following display technologies: Cathode ray tube display (CRT), Light-emitting diode display (LED), Electroluminescent display (ELD), Electronic paper, Electrophoretic Ink (E-ink), Plasma display panel (PDP), Liquid crystal display (LCD), High-Performance Addressing display (HPA), Thin-film transistor display (TFT), Organic light-emitting diode display (OLED), Surface-conduction electron-emitter display (SED), Laser TV, Carbon nanotubes, Quantum dot display, Interferometric modulator display (IMOD), Swept-volume display, Varifocal mirror display, Emissive volume display, Laser display, Holographic display, Light field displays, Volumetric display, Ticker tape, Split-flap display, Flip-disc display (or flip-dot display), Rollsign, mechanical gauges with moving needles and accompanying indicia, Tactile electronic displays (aka refreshable Braille display), Optacon displays, or any devices that either alone or in combination are configured to provide visual feedback on the status of a system, such as the "check engine" light, a "low altitude" warning light, an array of red, yellow, and green indicators configured to indicate a temperature range.

"Firewall" generally refers to a network security system the monitors and controls incoming outgoing network traffic based on predetermined security rules. Such security systems typically establish a barrier between a trusted internal network and untrusted outside networks such as the Internet. The firewall may be further categorized as either "network" or "host-based". Network firewalls filter traffic between two or more networks. Network firewalls may be implemented as software running on general-purpose computer hardware, or specific hardware-based network appliances which may employ one or more Application-Specific Integrated Circuit (ASIC) processors program specifically for network security monitoring and access control. Firewall appliances may also offer other functionality to the internal network they protect, such as acting as a Dynamic Host Control Protocol (DHCP) or Virtual Private Network (VPN) services for the protected network. Host-based firewalls may be implemented as software running on host computers that controls network traffic between the host computer and any networks the host computer may be connected to. Examples of software firewalls include firewalls operating as part of the host computers operating system, or separate software packages installed and operated as a service that intercepts and controls all network traffic into and out of the host computer. Host-based firewalls may also be implemented using processors on control boards installed in the host computer that interface with outside networks the host computers connected to.

"Input Device" generally refers to a device coupled to a computer that is configured to receive input and deliver the input to a processor, memory, or other part of the computer. Such input devices can include keyboards, mice, trackballs, touch sensitive pointing devices such as touchpads, or touchscreens. Input devices also include any sensor or sensor array for detecting environmental conditions such as temperature, light, noise, vibration, humidity, and the like.

"Index" generally refers to an indicator, guide, sign, gauge, signal, token, or mark used to precisely and accurately position one object into a proper spatial relationship with another. The index may or may not require physical interaction between the two objects. For example, a peg may index a proper position by holding one object in the proper relationship with another. Similarly, a magnet on one object may be operable as an index when used in conjunction with another magnet or ferromagnetic item attached to the second object.

"Memory" generally refers to any storage system or device configured to retain data or information. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

"Multiple" as used herein is synonymous with the term "plurality" and refers to more than one, or by extension, two or more.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices.

Computers coupled to a network may be referred to as "nodes" or as "hosts" and may originate, broadcast, route, or accept data from the network. Nodes can include any computing device such as personal computers, phones, servers as well as specialized computers that operate to maintain the flow of data across the network, referred to as "network devices". Two nodes can be considered "networked together" when one device is able to exchange information with another device, whether or not they have a direct connection to each other.

Examples of wired network connections may include Digital Subscriber Lines (DSL), coaxial cable lines, or optical fiber lines. The wireless connections may include BLUETOOTH, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11 (b), 802.11(g), or 802.11(n) to name a few). Wireless links may also include or use any cellular network standards used to communicate among mobile devices including 1G, 2G, 3G, or 4G. The network standards may qualify as 1G, 2G, etc. by fulfilling a specification or standards such as the specifications maintained by International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced.

Cellular network standards may use various channel access methods such as FDMA, TDMA, CDMA, or SDMA. Different types of data may be transmitted via different links and standards, or the same types of data may be transmitted via different links and standards.

The geographical scope of the network may vary widely. Examples include a body area network (BAN), a personal area network (PAN), a local-area network (LAN), a metropolitan area network (MAN), a wide area network (WAN), or the Internet.

A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

A network may utilize different communication protocols or messaging techniques including layers or stacks of protocols. Examples include the Ethernet protocol, the internet protocol suite (TCP/IP), the ATM (Asynchronous Transfer Mode) technique, the SONET (Synchronous Optical Networking) protocol, or the SDE1 (Synchronous Digital Elierarchy) protocol. The TCP/IP internet protocol suite may include application layer, transport layer, internet layer (including, e.g., IPv6), or the link layer.

"Network Appliance" generally refers to a computer specifically configured to perform a predetermined set of one or more network related functions on a computer network. For example, computers dedicated to a single function such as firewall, web server, router, switch, hub, encryption device, a wireless endpoint or repeater, an SSL/TLS proxy, also known as a Break aNd Inspect (BNI) device, file server, data cache, database server, and the like may be thought of as "network appliances". A single network appliance may include multiple functions such as firewall, web server, Domain Name Service (DNS) server, file server, router, and switch.

"Open Systems Interconnection Model (OSI model)" or "OSI Stack" generally refers to a conceptual model that characterizes and standardizes communication functions of a telecommunication or computing system without regard to their underlying internal structure and technology. The model partitions a communication system into multiple "layers" to allow different communications systems, such as a computer network or telecommunications system, to operate together.

In general, the OSI model defines seven layers, although additional layers may be included, or layers merged, as the state of the art in telecommunications advances. The layers are conceptually ordered in a "stack" where lower layers hand off data to upper layers and vice versa. For example, a layer that provides error-free communications across a network provides the path needed by applications above it, while it calls the next lower layer to send and receive packets that comprise the contents of that path. Two instances at the same layer are visualized as connected by a horizontal connection in that layer. Layers in the OSI model are arranged as shown below:

|  | Layer | Protocol data unit (PDU) | Function |
| --- | --- | --- | --- |
| Host layers | 7. Application | Data | High-level APIs, including resource sharing, remote file access |
|  | 6. Presentation |  | Translation of data between a networking service and an application; including character encoding, data compression and encryption/decryption |
|  | 5. Session |  | Managing communication sessions, i.e. continuous exchange of information in the form of multiple back-and-forth transmissions between two nodes |
|  | 4. Transport | Segment (TCP)/ Datagram (UDP) | Reliable transmission of data segments between points on a network, including segmentation, acknowledgement and multiplexing |
| Media layers | 3. Network | Packet | Structuring and managing a multi-node network, including addressing, routing, and traffic control |
|  | 2. Data link | Frame | Reliable transmission of data frames between two nodes connected by a physical layer |
|  | 1. Physical | Bit | Transmission and reception of raw bit streams over a physical medium |

"Layer 1: Physical Layer" generally refers to the lowest conceptual layer of the OSI model. The Physical Layer is responsible for ultimate transmission of digital data bits from the Physical layer of the sending (source) device over specific media in a network communications link to the Physical Layer of the receiving (destination) device. Examples of Layer 1 technologies include Ethernet cables and Token Ring networks. Additionally, hubs, switches, and other repeaters are standard network devices that function at the Physical Layer, as are cable connectors. At the Physical layer, data are transmitted using the type of electromagnetic signaling supported by the physical medium: electromagnetic waves through air, variations in voltage or current over a wire, or pulses of infrared or ordinary light to name a few non-limiting examples.

"Layer 2: Data Link Layer" generally refers to a conceptual layer between the lowest layer (the Physical Layer), and the "Network Layer". The Data Link Layer receives data from the physical layer and checks for physical transmission errors and packages bits into data "frames". The Data Link layer also manages physical addressing schemes such as MAC addresses for Ethernet networks, controlling access of any various network devices to the physical medium. Because the Data Link layer is generally the single most complex layer in the OSI model, it is often divided into two parts, the "Media Access Control" sublayer and the "Logical Link Control" sublayer.

"Layer 3: Network Layer" generally refers to a conceptual layer in the OSI model between the Data Link Layer and the "Transport Layer." The Network layer adds the concept of routing above the Data Link layer. When data arrives at the Network layer, the source and destination addresses contained inside each frame are examined to determine if the data has reached its final destination. If the data has reached the final destination, the Network Layer formats the data into packets delivered up to the Transport layer. Otherwise, the Network layer updates the destination address and pushes the frame back down to the lower layers. To support routing, the Network layer maintains logical addresses such as IP addresses for devices on the network. The Network layer also manages the mapping between these logical addresses and physical addresses. In IP networking, for example, this mapping is accomplished through the Address Resolution Protocol (ARP).

"Layer 4: Transport Layer" generally refers to a conceptual layer in the OSI model between the Network Layer and the "Session Layer." The Transport Layer delivers data across network connections. Transmission Control Protocol (TCP) is the most common example of a Transport Layer network protocol. Different transport protocols may support a range of optional capabilities including error recovery, flow control, and support for re-transmission.

"Layer 5: Session Layer" generally refers to a conceptual layer in the OSI model between the Transport Layer and the "Presentation Layer." The Session Layer manages the sequence and flow of events that initiate and tear down network connections. The Session Layer, it is built to support multiple types of connections that can be created dynamically and run over individual networks.

"Layer 6: Presentation Layer" generally refers to a conceptual layer in the OSI model between the Session Layer and the "Application Layer." The Presentation layer is the simplest in function of any piece of the OSI model. At Layer 6, it handles syntax processing of message data such as format conversions and encryption/decryption needed to support the Application layer above it.

"Layer 7: Application Layer" generally refers to the highest conceptual layer in the OSI model. The Application layer supplies network services to end-user applications. Network services are typically protocols that work with user's data. For example, in a Web browser application, the Application layer protocol HTTP packages the data needed to send and receive Web page content. The Application Layer provides data to (and obtains data from) the Presentation layer.

"Output Device" generally refers to any device or collection of devices that is controlled by computer to produce an output. This includes any system, apparatus, or equipment receiving signals from a computer to control the device to generate or create some type of output. Examples of output devices include, but are not limited to, screens or monitors displaying graphical output, any projector a projecting device projecting a two-dimensional or three-dimensional image, any kind of printer, plotter, or similar device producing either two-dimensional or three-dimensional representations of the output fixed in any tangible medium (e.g. a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Personal computing device" generally refers to a computing device configured for use by individual people. Examples include mobile devices such as Personal Digital Assistants (PDAs), tablet computers, wearable computers installed in items worn on the human body such as in eye glasses, laptop computers, portable music/video players, computers in automobiles, or cellular telephones such as smart phones. Personal computing devices can be devices that are typically not mobile such as desk top computers, game consoles, or server computers. Personal computing devices may include any suitable input/output devices and may be configured to access a network such as through a wireless or wired connection, and/or via other network hardware.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of 2200 Mission College Boulevard, Santa Clara, Calif. 95052, USA.

Another example of a processor is an Application-Specific Integrated Circuit (ASIC). An ASIC is an Integrated Circuit (IC) customized to perform a specific series of logical operations is controlling the computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a hardware description language (HDL). In FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Rule" generally refers to a conditional statement with at least two outcomes. A rule may be compared to available data which can yield a positive result (all aspects of the conditional to statement of the rule are satisfied by the data), or a negative result (at least one aspect of the conditional statement of the rule is not satisfied by the data). One example of a rule is shown below as pseudo code of an "if/then/else" statement that may be coded in a programming language and executed by a processor in a computer:

```
if(clouds.areGrey( ) and
(clouds.numberOfClouds > 100)) then }
    prepare for rain;
{else }
    Prepare for sunshine;
}
```

"Triggering a Rule" generally refers to an outcome that follows when all elements of a conditional statement expressed in a rule are satisfied. In this context, a conditional statement may result in either a positive result (all conditions of the rule are satisfied by the data), or a negative result (at least one of the conditions of the rule is not satisfied by the data) when compared to available data. The conditions expressed in the rule are triggered if all conditions are met causing program execution to proceed along a different path than if the rule is not triggered.

"Resource" generally refers to anything that has an identity. Familiar examples include an electronic document, an image, a video file, a service (e.g., "today's weather report for Los Angeles"), or collections of other resources (e.g. a Wiki or message board). The resource is the conceptual mapping to an entity or set of entities, not necessarily the entity which corresponds to that mapping at any particular instance in time. Thus, a resource can remain constant even when its content (the entities to which it currently corresponds) changes over time, provided that the conceptual mapping is not changed in the process. An example of this concept include a Wiki, or a blog.

A resource may be a physical thing, or an abstract concept, providing the concept is given an identity, and this identity is expressed by an effective Resource Identifier. Thus not all resources are network "retrievable"; e.g., human beings, corporations, and bound books in a library can also be considered resources but cannot necessarily pass over a computer network. Examples of abstract resources include operators and operands of a mathematical equation, the data types of a relationship (e.g., "parent" or "employee"), numeric values (e.g., zero, one, and infinity), or streaming data from a financial exchange.

"Resource Identifier (URI)" generally refers to a string of characters or other data used to identify a resource. A resource identifier may be thought of as a locator, a name, or both and need not conform to any particular convention. For example, a random string of data bits or characters, a machine generated hash code, a telephone number, a "mailto" tag with an address, a Uniform Resource Identifier (URI), a Uniform Resource Locator (URL), or any combination thereof my operate as resource identifiers. A resource identifier may be "uniform" in that it may conform to a preexisting standard (such as in the case of a URI), but such a uniform nature is not required. A resource identifier need only be recognizable at least to the system making the resource available, and be usable by the system requesting the resource.

Examples include representations of a resource using specific protocols over a network, such as the World Wide Web. In this context, resource identifier such as a URI may conform to a specific standard specifying a concrete syntax and associated protocols. The most common form of resource identifier is the Uniform Resource Locator (URL), frequently referred to informally as a web address. More rarely seen in usage is the Uniform Resource Name (URN), which was designed to complement URLs by providing a mechanism for the identification of resources in particular namespaces.

The term "Uniform Resource Locator" (URL) refers to the subset of URIs that, in addition to identifying a resource, define a specific means of locating the resource by describing its primary access mechanism (e.g., its network "location"). The term "Uniform Resource Name" (URN) has been used historically to refer to both URIs under the "urn" scheme, which are required to remain globally unique and persistent even when the resource ceases to exist or becomes unavailable, and to any other URI with the properties of a name.

For example, a URI may conform to The Internet Engineering Task Force (IETF) RFC 2396 entitled "Uniform Resource Identifiers (URI): Generic Syntax." In this case, the URI would at least conform to the following format:

scheme:[//[user[:password]@]host[:port]][/path][?query] [#fragment]

"Scheme" generally refers to a sequence of characters beginning with a letter and followed by any combination of letters, digits, plus sign, period, or hyphen. The scheme is followed by a colon. Examples of popular schemes include http, https, ftp, mailto, file, data, and irc. Most URI schemes are standardized and registered with the Internet Assigned Numbers Authority (TANA), although non-registered schemes are used in practice. The two slashes (e.g. "II") are required by some schemes and not required by some others. When the authority component is absent, the path component cannot begin with two slashes.

"User" and "password" generally refers to optional components of a URI that together form an "authentication section" that if present, is followed by an "at" symbol (an "@")

"Host" generally refers to either a registered name (including but not limited to a hostname), or an IP address. IPv4 addresses are represented in dot-decimal notation, and IPv6 addresses are enclosed in square brackets ("[ ]").

"Port number" generally refers to an identifier specifying a process to which a network message is to be forwarded when it arrives at a host. It is optional in a URI, and if present, is separated from the hostname by a colon.

"Path" generally refers to location data specifying where to find the requested resource on the host. A path is usually organized in hierarchical form like a file system path with elements indicating nodes in a tree structure, the elements separated by a delimiter such as a slash. The path may map mirror the host file system, or a portion thereof, but this is only one implementation of the path concept and is not required. Thus a path may be any suitable string of characters. The path begins with a single slash (/) if an authority part was present, and may also if one was not, but cannot begin with a double slash. The path is always defined, though the defined path may be empty (zero length).

"Query" generally refers to an optional portion that is separated from the preceding part of the URI by a question mark. The query includes a string of characters representing data available to the recipient host. Any suitable string of characters may follow the question mark. By convention, the string is commonly a sequence of attribute—value pairs separated by a delimiter such as an ampersand sign (an "&"). For example "?type=car&name=mustang" includes two key/value pairs where the keys are "type" and "name" respectively, and the corresponding values are "car" and "mustang", both pairs separated by an ampersand character.

"Fragment" generally refers to an optional portion that is separated from the preceding part by a hash symbol (a "#"). The fragment includes an identifier providing additional input to a secondary resource, such as a section heading in an article identified by the remainder of the URI. When the primary resource is an HTML document, the fragment is often an id attribute of a specific element, and web browsers commonly automatically scroll the page until this element is in view.

"Uniform Resource Locator (URL)" generally refers to a reference to a web resource that specifies the location of the resource on a computer network and a mechanism for retrieving it. A URL is an example of, or type of, Uniform Resource Identifier (URI) that identifies a resource by a standard representation of its primary access mechanism (e.g., its network "location"), rather than by some other attribute. URLs occur most commonly to reference web pages (http), but are also used for file transfer (ftp), email (mailto), database access (JDBC), and many other applications. A URL is sometimes informally referred to as a "web address".

What is claimed is:

1. A method, comprising:
    capturing input from a user specifying a request for a video resource stored on a remote computer using a network client application executing on a local computer, wherein the video resource has associated with it a resource identifier that includes a name of the remote computer, a path specifying a location of the resource on the remote computer, and a query string representing data to be sent to the remote computer, and wherein the network client application includes a monitoring module with rules programmed to determine whether the request should be evaluated by a filtering service running on a filtering computer;
    using the monitoring module executing on the local computer to determine that the request for the video resource should be evaluated by the filtering service;
    using the filtering service to accept a request for a filtering determination sent from the monitoring module, wherein the request for the filtering determination includes data specifying at least one type of determination to make with respect to the video resource;
    determining a filtering algorithm using the filtering service, the filtering algorithm selected from one or more algorithms programmed to determine whether the video resource will be allowed to pass through the computer network from the remote computer to the local computer;
    obtaining one or more filtering parameter values using the request for the filtering determination, wherein the filtering parameter values include at least the resource identifier and metadata about the video resource;
    executing the filtering algorithm using the filtering service and the filtering parameter values, wherein the algorithm is programmed to determine a filtering result specifying that the video resource should be blocked from traveling over the computer network from the remote computer to the local computer; and
    using the monitoring module to block the network client application from accessing the video resource.

2. The method of claim 1, wherein obtaining one or more filtering parameter values includes retrieving metadata about the video resource using the filtering service.

3. The method of claim 1, comprising:
    retrieving the video resource from the remote server, using the filtering service;
    extracting one or more individual frames from the video resource as one or more individual image files using the filtering service;
    comparing the one or more individual image files to one or more predefined patterns associated with the type of determination requested in the request for a filtering determination using the filtering service; and
    using the filtering service to generate a confidence level for each of the one or more predefined patterns compared using the filtering service, the confidence level indicating a likelihood that the individual frames from the video resource include a the corresponding predefined pattern.

4. The method of claim 1, wherein the request for the video resource includes parameters specifying that the request for the video resource and any resulting response are to be encrypted, and wherein the monitoring module intercepts the request from the network client application and engages the filtering service before the request is encrypted.

5. The method of claim 1, wherein the monitoring module blocks the network client application from accessing the video resource by indicating to the network client application that the video resource does not exist on the remote computer.

6. The method of claim 1, wherein the filtering result includes a location of a blocked access resource, and wherein the monitoring module blocks the network client application from accessing the video resource by redirecting the network client application to request the blocked access resource instead of the video resource requested by the user.

7. The method of claim 1, wherein the filtering service is programmed to determine the filtering algorithm at least based on the path of the video resource, the type of determination specified in the request for the filtering determination, and optionally on the query string of the video resource.

8. The method of claim 1, wherein the filtering algorithm compares aspects of the resource identifier and the metadata with one or more rules associated with type of determination to make, and wherein the algorithm is programmed to evaluate at least the path, the request for the filtering determination, the metadata, and optionally the query string.

* * * * *